Sept. 29, 1942. H. J. R. VON BAEYER ET AL 2,297,514
WAVE COIL HAVING A SMOOTHED CHARACTERISTIC IMPEDANCE
Filed Oct. 31, 1940

Inventors
Hans Jakob Ritter von Baeyer,
Hans Otto Roosenstein and Robert Tanzen
By H. S. Grover
Attorney Patented Sept. 29, 1942

2,297,514

UNITED STATES PATENT OFFICE 2,297,514

WAVE COIL HAVING A SMOOTHED CHARACTERISTIC IMPEDANCE

Hans Jakob Ritter von Baeyer, Hans Otto Roosenstein, and Robert Tantzen, Berlin, Germany; vested in the Alien Property Custodian Application October 31, 1940, Serial No. 363,666
In Germany June 19, 1939

4 Claims. (Cl. 178—44)

Figure 2:
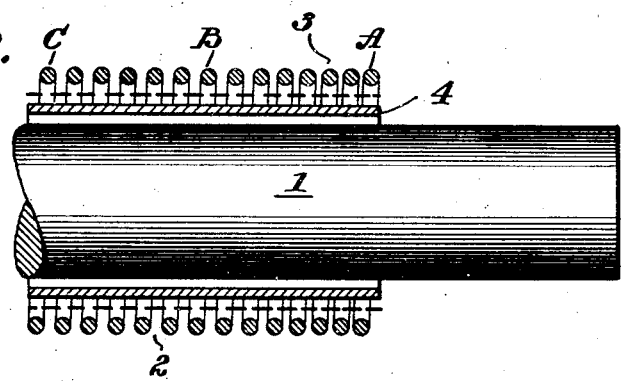
Figure 2A:
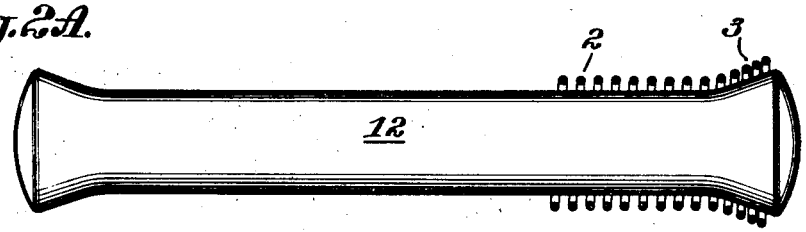
Figure 3:
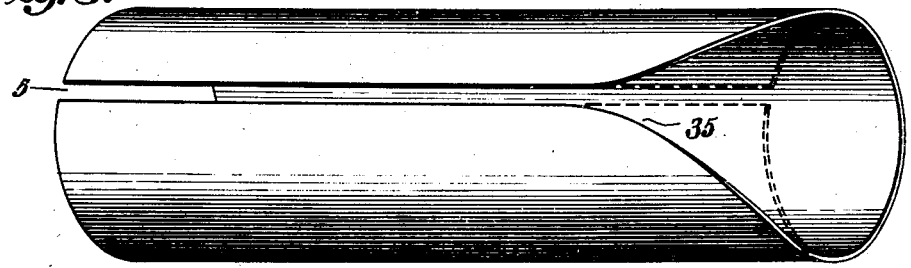

In co-pending patent application, Serial No. 322,656 filed March 7, 1940, now Patent No. 2,258,261, issued Oct. 7, 1941, a coil having line characteristics has been disclosed in which the dependence of the line characteristic or property upon the frequency has been minimized by cross division of the dielectric or the ferro-magnetic material. Although this step insures a substantial de-coupling between adjacent parts of the coil, the disturbing effect still remains quite appreciable in the case of current distribution in which there is a marked dependence upon the distance in the direction of the coil axis. This applies particularly to the free end of the coil which experiences a sudden drop from a finite value to zero. This free end is graphically shown in Figure 1, while Figures 2, 2A and 3 illustrate the application of the present invention to overcome the problem.

Figure 1:
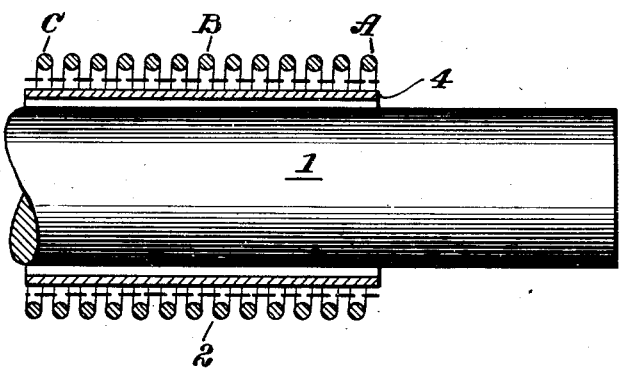

Referring to Figure 1, I denotes the iron-core, which, as disclosed in the earlier application, may be subdivided transversally, while the winding 2 terminates at the point marked A. The shield, denoted by 4, may be placed inside the coil as shown or outside if desired. Assuming, for the sake of simplicity of explanation, that the coil is fed with a frequency so low that at points A, B, C practically the same current flows throughout, then it will be evident that a turn at B where there are neighboring turns both on the right- and the left-hand side, will have potentials induced in it from such adjacent spires. These potentials, because of the value of the mutual couplings, will be high in contrast to the potential induced in the turn under consideration by virtue of its own inductance. In other words, the potential of the turn in question arises practically only as a result of mutual inductance relation with the adjacent turns. But a turn at A, contradistinct to a turn at B, has neighbors only on the one side. Hence, the voltage induced therein is exactly one-half the induced voltage in a turn at B, for the latter turns have twice as many neighbors. Applied to a line and the considerations holding good therefor, this could also be expressed as if to a turn at A there inheres an apparent self-inductance only one-half of a turn at B. Now, it is this very effect which in coils built as before outlined must of necessity occasion a reflection of the wave at the remote end, regardless of the choice of terminating resistance connected thereto.

Inasmuch as reflections of this kind have proved in practice to be extremely disturbing, the invention discloses ways and means designed to compensate for such deficiency, as it were, of inductance prevailing at the ends of the coil. To this end, two methods are suggested, both of them leading to the desired result.

In the first place, it is possible to compensate for such deficiency of inductance by providing an artificial increase in the inductance.

Furthermore, it is possible to complete the deficiency of inductance by a reduction of the capacity in such a way that the surge or characteristic impedance $$W = \sqrt{\frac{L}{C}}$$

remains stable throughout the length of the coil. In the last mentioned solution, to be sure, the phase constant $$\alpha = \frac{2\pi}{\lambda} = \omega\sqrt{LC}$$

at the ends of the coil will turn out lower than in the middle. However, since it is the over-all phase constant that is important together with the fact that internal reflections due to changes in the characteristic impedance are avoided, an entirely satisfactory result is secured by this solution.

The change of the self-inductance as suggested in the first solution towards the free end of the coil is accomplishable in a simple manner by winding the coil more closely at the free ends. Moreover, as shown in Figure 2 wherein turns 3 are more closely spaced than the remainder, in the case of iron-cored coils the permeability of the iron or the quantity of iron taken per cross-section of the coil may be altered towards the ends either uniformly or discontinuously.

Figure 2A, for instance, shows an iron-core 12 in schematic form which may be regarded, basically, as favorable for accomplishing the said end. Of course, it is also possible in the case of a transversally subdivided iron-core of the kind disclosed in the above-mentioned earlier application, to make the spacings between the various iron disks smaller in the direction towards the end of the coil. Finally, an increase in the inductance is obtainable by enlarging the diameter of the turns or of the core at the free end as compared with the diameter of turns in the middle of the coil. A few turns 2, 3 show this clearly. In fact, this step is useful also with air-cored coils.

The second solution above-mentioned may be carried into effect in the following fashion: The specific capacity of the line per unit of length, as pointed out, must be less at the free end than in the middle of the line.

Figure 3 shows the shielding 34 modified in accordance with the invention. As pointed out in the earlier application, the shield presents an axial split 5, the latter being here enlarged at 35 in the direction towards the end of the coil. The reduction of the capacity at the free end, of course, could also be insured by a gradual or stepwise increase in the thickness of the insulation material, that is to say, the distance between this shield or a metallic cylinder arranged inside the coil and the turns of the latter. It is finally feasible also by reduction of the effective dielectric constant to reduce the capacity at the end of the coil.

It will be understood that both the said two solutions and steps could be carried into practice combinedly.

We claim:

1. A wave coil having a winding of a plurality of convolutions of a conductor, said convolutions being more closely adjacent each other at the ends of the winding than at intermediate points whereby the ratio of inductance to capacity per convolution of the coil is maintained constant throughout the length of said coil.

2. A wave coil having a winding of a plurality of convolutions of a conductor, a shielding cylinder in the neighborhood of the winding and means for maintaining the ratio of inductance to capacity per convolution of said coil constant throughout the length of said coil, said means including a longitudinal slit along the length of said cylinder, said slit expanding toward the ends of said cylinder whereby the capacity effect between said cylinder and said winding is decreased towards that end.

3. A wave coil having a winding of a plurality of convolutions of a conductor and means associated with the convolutions at the ends of said coil for causing the ratio of inductance to capacity of the end convolutions of said coil to equal said ratio for the convolutions throughout the remainder of said coil.

4. A wave coil having a winding of a plurality of convolutions of a conductor and means associated with the convolutions at the ends of said coil for causing the ratio of inductance to capacity of the end convolutions of said coil to equal said ratio for the convolutions throughout the remainder of said coil, said means operating to increase the inductance of the end convolutions of said coil.

HANS JAKOB RITTER VON BAEYER.
HANS OTTO ROOSENSTEIN.
ROBERT TANTZEN.